Nov. 2, 1971    W. F. CORRISTON    3,616,516
METHOD AND APPARATUS FOR REPAIRING INSULATED PIPE
Filed Jan. 12, 1970    2 Sheets-Sheet 2
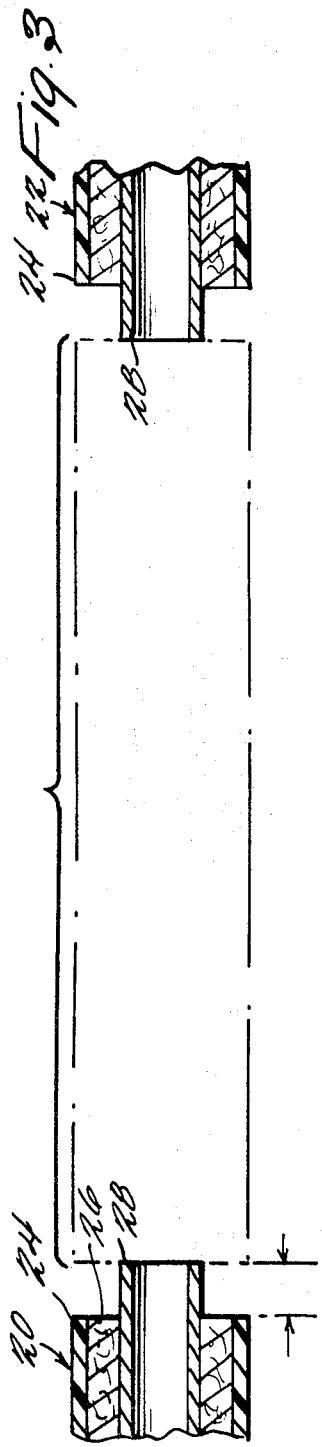
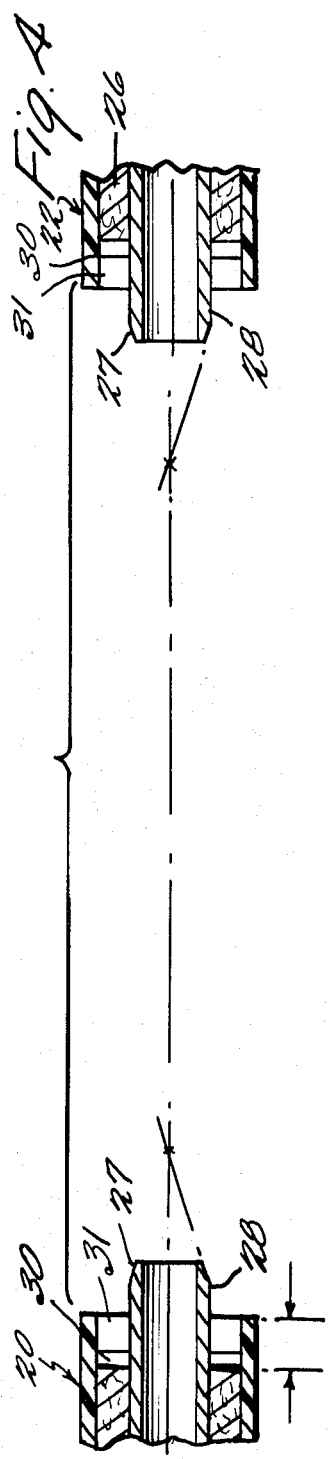
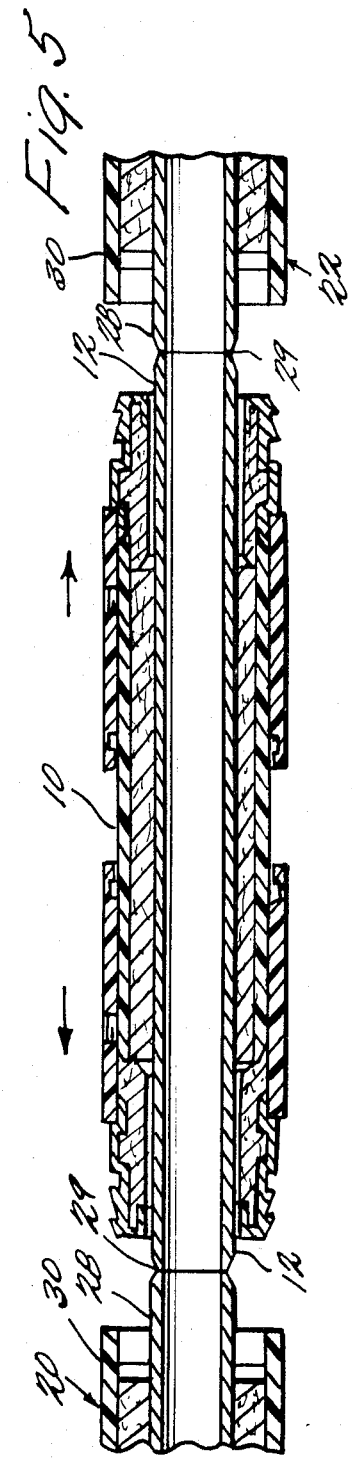
INVENTOR
WINFIELD F. CORRISTON
BY
John A. McKinney
ATTORNEY //
United States Patent Office 3,616,516
Patented Nov. 2, 1971

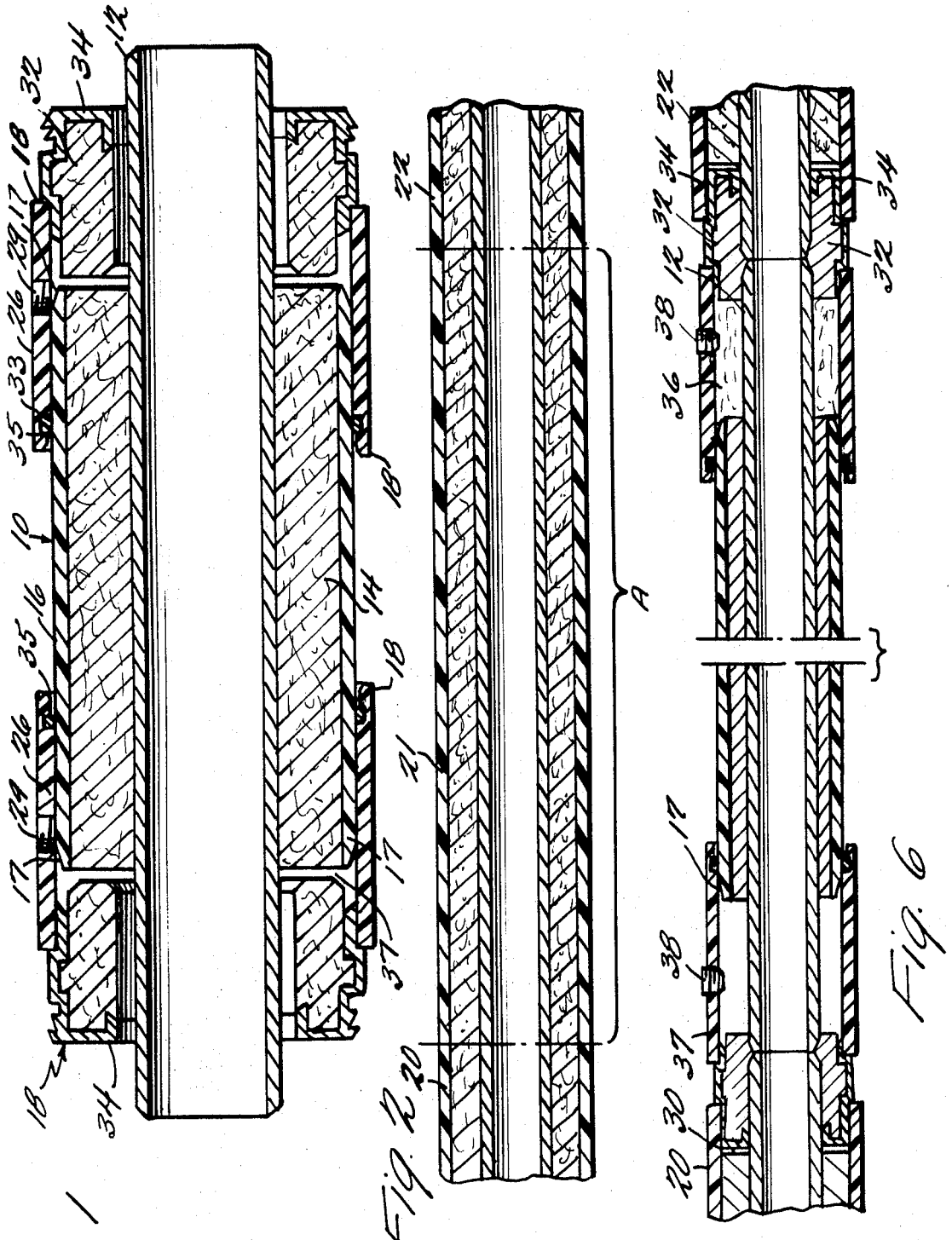

3,616,516
METHOD AND APPARATUS FOR REPAIRING INSULATED PIPE
Winfield F. Corriston, Far Hills, N.J., assignor to Johns-Manville Corporation, New York, N.Y.
Filed Jan. 12, 1970, Ser. No. 2,237
Int. Cl. B22d *19/10;* F01b *25/02;* F01c *21/12*
U.S. Cl. 29—401                                    14 Claims

ABSTRACT OF THE DISCLOSURE

Method and apparatus are described for repairing insulated pipe. The insulated pipe repair apparatus comprises an inner transfer pipe, an outer conduit surrounding the inner transfer pipe forming an annular space having insulation material therein with the outer conduit supporting slidable coupling means. The apparatus is used in the repair of insulated pipeline by removing a section of the insulated pipeline which is to be replaced and preparing the exposed sections of the remaining insulated pipeline. The preparation consists of cutting off a predetermined amount of the outer casing and insulation material leaving the inner transfer pipes extending outwardly from the end of outer conduits. End seals are then inserted into the annular space formed by removal of the insulation material.

The pipe repair apparatus is lowered into position so that its inner transfer pipe is coaxially aligned with the inner transfer pipe of the sections of the insulated pipeline at which time the inner transfer pipes are secured together. The coupling means on the repair apparatus are moved away from the outer casing, bringing them into contact with the end seals. The space left by the movement of the coupling means, away from the outer casing, is filled with insulation material and sealed so that a continuous insulated pipeline is formed.

---

The present invention relates to a new and useful improvement in a method of joining insulated conduits or pipe and to the conduit or pipe repair apparatus itself. More specifically the invention relates to an insulated pipe repair apparatus and method of joining insulated pipe sections using a double-coupling repair apparatus.

The improved insulated conduit repair fitting method and apparatus provides continuous core-type support of the inner transfer pipe, with no pipe guides being required. The insulated conduit has a watertight casing with seals resisting up to a 50-foot head water pressure which adequately meets all building requirement codes. Additional benefits are derived from the tight junction of the coupling and construction of the repair apparatus which limits thermal leakage to a minimum while providing seal protection.

The use of the invention facilitates construction, servicing and repair of thermally insulated conduits. Each length of the conduit is constructed so that it is isolated and compartmentized enabling it to be completely self-sustaining.

The present invention and its usage enables the easy installation or repair of a thermally insulated pipeline, thus saving time, effort and space for assembly or disassembly resulting in labor savings due to the easy installment of the insulated pipe. The installation of the insulated pipe is particularly advantageous in that skilled labor is not required. Additional monetary savings come about because the welding of the inner pipeline is limited. Another added feature is that installment costs of the pipe are accurately predetermined which is beneficial in providing accurate job estimates in repair installations or initial installations. In prior repair apparatus and processes, the cost could not be accurately determined because of varying numbers of factors.

Fuller understanding of the invention and other purposes of the invention may be had by referring to the following description and claims taken in conjunction with the accompanying drawings in which:

FIG. 1 discloses a cross sectional view of the conduit repair apparatus of the invention;

FIG. 2 discloses a cross sectional view of a standard insulated pipeline showing a simulated section A of the pipeline which is to be removed;

FIG. 3 discloses a cross sectional view of the pipeline shown in FIG. 2 after the simulated section A has been removed and a predetermined portion of the outer casing and insulation material have been cut away from the remaining sections of the insulated pipeline;

FIG. 4 represents a cross sectional view of the pipeline shown in FIG. 3, in which the inner transfer pipes have been milled and a predetermined amount of insulation has been removed from the pipeline sections enabling end seals to be inserted around the inner transfer pipe;

FIG. 5 represents a cross sectional view of the insulated conduit apparatus disclosed in FIG. 1, positioned so that it is coaxially aligned and secured with the insulated pipeline sections shown in FIG. 4; and FIG. 6 discloses a cross sectional view of the insulated conduit apparatus shown in FIG. 5 with its coupling means slidably extended to cooperate with the insulated pipeline sections to form a sealed insulated pipeline.

FIG. 1 discloses the conduit repair apparatus 10 which comprises an inner transfer pipe 12 having a surrounding layer of insulation 14, an outer casing 16 surrounding the insulation material 14 and coupling means 18. The inner transfer pipe 12 ends extends past the ends of the outer insulated pipe or casing 16. In the preferred embodiment of the invention, the inner transfer pipe 12 is constructed of steel and the outer casing 16 is constructed of asbestos cement. However, any suitable materials can be used in the construction of these components as long as the material has sufficient strength and a relatively low expansion coefficient to avoid extensive expansion and contraction, as for example, but not to be construed as a limitation, a plastic inner transfer pipe could be utilized having, if desired, any number of commercial coatings.

FIGS. 2-6 disclose the method of repairing an insulated pipe or pipeline. Initially, the section of pipe or pipeline 21 which is to be removed is cut through as shown by the dotted line A in FIG. 2, allowing the removal of the desired section of insulated pipe so that the required repairs or adjustments can take place. The remaining sections 20 and 22 of insulated pipeline 21 are then cut, as shown in FIG. 3, so that the outer casing pipe 24 and insulation material 26 of the remaining sections 20 and 22 of the insulated pipeline 21 are removed from the inner transfer pipe 28, causing the transfer pipe to project beyond the cut edge of outer casing 24. Thus, sections 20 and 22 have projecting lengths of inner transfer pipe 28 which face each other. Preferably, one and one-half inches are cut off the outer casing 24 and insulation material 26, but it is apparent that any desired amount can be removed to fit any particular operation. An additional inch of insulation material 26 is removed, forming annular space 31 which is bounded by the inner surface of the outer casing 24, the outer surface of the inner steel transfer pipe 28 and the insulation material 26. End seals 30 are then inserted or placed in the annular space so that they securely fit in the annular area. If desired, the inner diameter of the outer casing 24 is machined to facilitate the insertion of end seal 30. The outer surfaces of the inner steel transfer pipe 28 are then machined, as shown in FIG. 4, at 27 so that a proper welding surface 29 can be obtained. Conduit repair apparatus 10, containing coupling means, is positioned so that its inner transfer pipe 12 is coaxially aligned with the inner transfer pipes 28 of sections 20 and 22. The conduit repair apparatus 10, which is used in the repair assembly has an inner transfer pipe 12, which is of substantially the same diameter as the inner transfer pipe of the insualted pipe section which was removed. Since pipe diameters have been standardized throughout the industry, the insulated conduit repair apparatus can be pre-constructed for any standard size insulated pipe. The inner transfer pipe 12 of the conduit repair apparatus 10 has a length which is slightly less than the length of the inner transfer pipe section, which was removed from the original insulated pipeline 21. This construction enables the ends of the inner transfer pipe 12 to be positioned opposite the ends of the inner transfer pipes 28 so that transfer pipe 12 can be coaxially aligned with the inner transfer pipes 28 of the remaining insulated pipeline sections 20 and 22. The coaxially aligned inner transfer pipe sections can be secured together by any appropriate means, as for example, welding. However, adhesives or other securing means may be used if desired. The inner transfer pipe 12 of the conduit repair apparatus 10 is surrounded by an insulation material 14. Outer casing 16 which has milled or tapered ends 17 surrounds the insulation material 14, forming a protection covering. The outer casing 16 supports coupling means 18, each of which is slidably mounted on the outer casing 16 by a sleeve 26 which cooperates with an end seal 34 and lock block 32.

When the coupling means 18 are placed on the outer casing 16, the outer surface of the outer casing is coated with a suitable lubricant, such as silicone, and the coupling means 18 are pushed or pulled over the tapered edge 17 of outer casing 16 until they are slidably seated on outer casing 16, where they can be later pushed, pulled or moved away from each other into sealing position with end seals 30 of pipe sections 20 and 22. When the coupling means 18 are positioned on the outer casing 16, the ends of the inner transfer pipe 12 extend past the end seals 34 of the coupling. The lock block 32 is, preferably, made of insulated material while the end seal 34 is, preferably, constructed of elastic material, such as rubber. The sleeves 26, which are mounted on the outer casing 16, have a tapped hole or aperture 29 therethrough which is, preferably, threaded to receive a threaded plug 38, as shown in FIG. 6. Any type of plug or fastener 38 can be used to cover or seal the apertures 29. One example of such a plug of fastener would be a resilient pop-in fastener. An annular groove 35 is cut or formed into the sleeve 26 which holds a sealing ring or gasket 33. Preferably, the groove is cut with axial sidewalls. The annular sealing ring or gasket 33 is, preferably, made of a resilient material such as rubber and has a general O ring construction, but it can be of any structure which is conventionally used in joining sections of asbestos cement pipe or insulated pipe. The gasket or sealing ring can be made of any material which provides an effective seal at the pipe joint and prevents thermal loss. Suitable material for the gasket or sealing ring can be selected from such materials as rubber, glass, fabric, asbestos, plastic and various compositions of those materials. As by means of example, a typical sealing ring or gasket, which could be used in the invention, is set forth in the patent to Kazienko, No. 3,137,509, issued June 16, 1964. The couplings used on the outer casing can be standard couplings used in the industry, if such couplings can be effectively used. It should be noted that the outer casing 16 is, preferably, lubricated by silicon or other suitable lubricants so that the coupling means 18 may be easily moved into sealing position with pipe sections 20 and 22 by exerting a force in opposite directions on sleeves 26 which insures an even distribution of movement by the sleeves. When the repair apparatus 10 has been positioned and sealed so that the insulated lock blocks 32 and end seals 34 contact with sections 20 and 22 to form a sealed insulated pipeline, insulation material 36 is inserted into the generally annular space 37 formed by the couplings which have been extended past the inner transfer pipe 12. After, during, or before the insulation material 36 has hardened, plugs 38 are screwed or inserted into apertures 29, so that the newly placed section of thermal conduit is thoroughly insulated and sealed.

Although the present invention has been described and illustrated in connection with various embodiments, it is to be understood that modifications and variations may be resorted to without departing from the spirit of the invention, as those skilled in the art will readily understand. Such modifications and variations are considered to be within the purview and scope of the present invention as defined by the appended claims.

I claim:
1. An apparatus for repairing insulated pipe comprising:
    an inner transfer pipe,
    insulation material surrounding said inner transfer pipe,
    an outer casing surrounding said inner transfer pipe and said insulation material,
    coupling means slidably mounted on said outer casing that can be slidably extended beyond the end of said inner transfer pipe,
    said coupling means comprising slidable sleeves having filling means and sealing means which cooperate to join said apparatus to an insulated pipeline.
2. An apparatus for repairing insulated pipe as claimed in claim 1 wherein said filling means is an aperture extending through said sleeve.
3. An apparatus for repairing insulated pipe as claimed in claim 2 wherein said aperture has sealing means.
4. An apparatus for repairing insulated pipe as claimed in claim 3 wherein said sealing means is a removable plug.
5. An apparatus for repairing insulated pipe as claimed in claim 1 wherein said sealing means comprises an insulated lock block and end seal.
6. An apparatus for repairing insulated pipe as claimed in claim 1 wherein said sleeve has an annular groove therein, said annular groove having an annular sealing ring therein which cooperates with said outer casing to form a sealed insulated pipeline.
7. A method for repairing insulated pipe comprising an outer casing, insulation material and inner transfer pipe, comprising the steps of:
    cutting through an insulated pipe,
    removing a section of insulated pipe,
    removing a predetermined amount of the outer casing and insulation material off the remaining sections of said insulated pipe, leaving an inner transfer pipe,
    placing end seals on said remaining insulated pipe sections,
    positioning a conduit repair apparatus in coaxial relationship to said insulated pipe sections,
    securing said conduit repair apparatus with said insulated pipe sections,
    adjusting coupling means of said conduit repair apparatus to form a coupling with each of said sections of said insulated pipeline,
    filling said conduit repair apparatus with insulation material, and
    sealing said conduit repair apparatus to retain said insulation material.
8. A method for repairing insulated pipe as described in claim 7 wherein said conduit repair apparatus and insulated pipeline sections have inner transfer pipes which are coaxially aligned and secured.

9. A method for repairing insulated pipe as described in claim 7 wherein the outside diameter of said inner transfer pipes are machined before said conduit repair apparatus is positioned in coaxial relationship to said insulated pipe sections.

10. A method for repairing insulated pipe as described in claim 7 wherein said conduit repair apparatus is secured to said insulated pipe sections by welding.

11. A method for repairing insulated pipe as described in claim 7 wherein said conduit repair apparatus is lubricated before placing said conduit repair apparatus in coaxial relationship to said insulated pipeline.

12. A method for repairing insulated pipe as described in claim 11 wherein coupling means are mounted on said conduit repair apparatus after said conduit repair apparatus is lubricated but before said conduit repair apparatus is positioned in coaxial relationship to said insulated pipe sections.

13. A method for repairing insulated pipe as described in claim 7 wherein said inside diameter of said outer conduit is machined before said end seals are placed on said remaining insulated pipe sections.

14. A method for repairing insulated pipe as described in claim 7 wherein additional insulation material is removed from said insulated pipe sections.

References Cited

UNITED STATES PATENTS

| | | | |
|---|---|---|---|
| 2,478,684 | 8/1949 | Brooks | 138—97 |
| 3,123,101 | 3/1964 | Blount et al. | 138—97 |
| 3,363,301 | 1/1968 | Delaruelle et al. | 29—401 X |
| 3,368,006 | 2/1968 | Gill | 264—36 |

FOREIGN PATENTS

| | | | |
|---|---|---|---|
| 659,790 | 10/1951 | Great Britain | 138—97 |

JOHN F. CAMPBELL, Primary Examiner

D. C. REILEY, Assistant Examiner

U.S. Cl. X.R.

29—527.1; 138—97; 264—32, 36